(12) United States Patent
Sonleiter et al.

(10) Patent No.: US 9,726,291 B2
(45) Date of Patent: Aug. 8, 2017

(54) SHAFT SEAL AND METHOD FOR PRODUCING A SHAFT SEAL

(71) Applicant: Karl Storz GmbH & Co. KG, Tuttlingen (DE)

(72) Inventors: Hubert Sonleiter, Immenstaad a.B. (DE); Raphael Spycher, Eschenz (CH)

(73) Assignee: Karl Storz GmbH & Co. KG, Tuttlingen (DE)

( * ) Notice: Subject to any disclaimer, the term of this patent is extended or adjusted under 35 U.S.C. 154(b) by 0 days.

(21) Appl. No.: 14/461,866

(22) Filed: Aug. 18, 2014

(65) Prior Publication Data

US 2015/0054226 A1 Feb. 26, 2015

(30) Foreign Application Priority Data

Aug. 22, 2013 (DE) ........................ 10 2013 109 081

(51) Int. Cl.
*F16J 15/32* (2016.01)
*F16J 15/3212* (2016.01)
*F16J 15/3236* (2016.01)
*F16J 15/3232* (2016.01)
*F16J 15/3216* (2016.01)
*F16J 15/3208* (2016.01)

(52) U.S. Cl.
CPC ....... *F16J 15/3212* (2013.01); *F16J 15/3236* (2013.01); *F16J 15/3208* (2013.01); *F16J 15/3216* (2013.01); *F16J 15/3232* (2013.01); *Y10T 29/49844* (2015.01)

(58) Field of Classification Search
CPC .... F16J 15/164; F16J 15/3204; F16J 15/3208; F16J 15/3212; F16J 15/3216; F16J 15/322; F16J 15/3224; F16J 15/3236
See application file for complete search history.

(56) References Cited

U.S. PATENT DOCUMENTS 1,892,944 A * 1/1933 Geyer ...................... F16F 1/24
267/37.2
3,406,979 A * 10/1968 Weber ...................... F16J 15/32
277/629
3,561,776 A * 2/1971 Wilson .................. F16J 15/121
277/647

(Continued)

FOREIGN PATENT DOCUMENTS

DE 1750819 A1 6/1971
DE 3702913 C1 4/1988

(Continued)

OTHER PUBLICATIONS

French Search Report & Written Opinion Application No. FR 1457825 Completion Date: Oct. 11, 2016 6 Pages.

*Primary Examiner* — Nicholas L Foster
(74) *Attorney, Agent, or Firm* — Whitmyer IP Group LLC

(57) ABSTRACT

A shaft seal includes a radially outward flange area and a radially inward sealing lip connected to the flange area. An annular spring with a U-shaped or V-shaped cross section is arranged on a radial outer face of the sealing lip, wherein an outer limb bears on the flange area and an inner limb bears on the sealing lip, and wherein a surface of the spring exposed to an exterior of the shaft seal is coated with an elastomer. The invention also relates to a method for producing a shaft seal.

9 Claims, 3 Drawing Sheets

(56) References Cited

U.S. PATENT DOCUMENTS

| | | | | |
|---|---|---|---|---|
| 3,949,530 | A * | 4/1976 | Williams | E06B 3/62 264/145 |
| 5,163,692 | A * | 11/1992 | Schofield | F16J 15/3236 277/436 |
| 5,265,890 | A * | 11/1993 | Balsells | F16F 3/12 277/467 |
| 5,799,953 | A * | 9/1998 | Henderson | F16J 15/3236 277/554 |
| 2009/0045592 | A1* | 2/2009 | Hurlbert | F16J 15/125 277/628 |
| 2010/0066032 | A1* | 3/2010 | Girman | F16J 15/3236 277/522 |
| 2010/0102517 | A1* | 4/2010 | Kumar | A61B 17/1646 277/553 |
| 2011/0140369 | A1* | 6/2011 | Lenhert | F16J 15/3216 277/589 |
| 2014/0327328 | A1* | 11/2014 | Puff | F16F 1/041 310/28 |

FOREIGN PATENT DOCUMENTS

| | | |
|---|---|---|
| DE | 102010041611 A1 | 3/2012 |
| EP | 0490204 A1 | 6/1992 |
| EP | 1884691 A1 | 2/2008 |

\* cited by examiner

A - A

SHAFT SEAL AND METHOD FOR PRODUCING A SHAFT SEAL

FIELD OF THE INVENTION

The present invention relates to a shaft seal and to a method for producing a shaft seal of this kind.

BACKGROUND OF THE INVENTION

A shaft seal for sealing a rotary shaft usually comprises an outer flange area, with which the seal can be inserted, for example, into a housing of a bearing for the shaft, and a sealing lip which is arranged inside the flange area and which provides a sealing action by bearing on the surface of the rotary shaft. To ensure that the sealing lip is pressed with sufficient pressing force onto the shaft, an annular spring is normally provided on an outer face of the sealing lip, which annular spring yields the necessary pressing force. A shaft seal of the stated type is also referred to as a rotary shaft seal.

DE 10 2010 041 611 A1 discloses a rotary shaft seal of this kind, which has an elastomer body with a substantially U-shaped cross section, with a sealing lip arranged on the inner passage side of the seal, and with an outer flange area. The flange area has a clamping surface and a sealing surface for respectively clamping and sealing the rotary shaft seal in a flange of a structural part. On the inner side of the sealing lip, a clamping ring is provided, which serves to press the sealing lip onto the shaft.

As clamping ring or spring, it is customary to use helical tension springs or garter springs, which ensure a sufficient pressing force and a sufficient deformability of the sealing lip. To maintain the radial force of the spring even in chemically aggressive media or in media containing solid particles of dirt, it has been proposed in patent specification DE 37 02 913 C1 that the running surface of the sealing lip and the helical tension ring, bearing on the outside of the sealing lip, are protected by a ring of low-friction plastic which has an approximately U-shaped cross section and is pushed over the sealing lip including the helical tension spring.

It is also known for a spring of a shaft seal to be embedded in the material from which the seal is made. However, the mechanical properties of the spring are disadvantageously altered in this way. In particular, a seal of this kind is very stiff and, with respect to the manufacturing tolerances of the seal and to the tolerances of the shaft that is to be sealed, does not permit precise adjustment of the contact pressure of the sealing lip. Potting the seal with silicone is also disadvantageous, particularly because of the danger of cracks forming.

Particularly in medical appliances in which a rotary shaft has to be sealed, it is particularly important that the seal is able to provide reliable sealing with compensation of possible tolerances. Moreover, in medical uses, for example in a surgical handpiece with a rotary shaft, the problem arises that the shaft seal, which is generally arranged on the outwardly exposed side of the seal, may come into contact with tissue, blood or other body fluids. Before repeat use of the handpiece, the seal has to be cleaned and sterilized. Therefore, particular demands are placed on the cleanability and on the stability and leaktightness of the shaft seal even under conditions of increased heat and pressure which occur during sterilization.

SUMMARY OF THE INVENTION

The object of the present invention is to make available a shaft seal that is easy to clean and that is suitable in particular for medical uses and permits a reliable sealing action. It is also the object of the invention to make available a method for producing a shaft seal of this kind.

This object is achieved by a shaft seal and method according to the invention.

Advantageous developments of the invention are set forth in the dependent claims.

A shaft seal according to the invention comprises a radially outward flange area, which serves to fasten the shaft seal in a structural part, for example in a housing opening or in a bearing, and which can have means for holding and sealing the shaft seal in the structural part. The shaft seal further comprises a radially inward sealing lip, i.e. a sealing lip arranged to the inside of the flange area. The sealing lip surrounds a through-opening of the shaft seal, through which opening a rotary shaft is intended to be passed. To bear sealingly on the shaft, the sealing lip can have at least one sealing edge directed toward the through-opening or the shaft. A substantially annular spring is arranged on a radially outer face of the sealing lip and presses the sealing lip or the sealing edge onto the surface of the shaft to be inserted into the through-opening. The sealing lip is connected to the flange area via an intermediate area, particularly in a leak-tight manner. The shaft seal as a whole is ring-shaped with for example a U-shaped cross section, wherein the radially outer limb of the U is formed by the flange area, the base of the U is formed by the intermediate area, and the radially inner limb of the U is formed by the sealing lip. Where "inner" and "outer" are mentioned below, this is to be understood, unless indicated otherwise, as being always in the radial direction, i.e. with respect to an axis of the shaft seal or to a longitudinal axis of the shaft that is to be inserted into the latter.

The flange area, the sealing lip and the intermediate area can be made, for example, of an elastomer or a thermoplastic, for example of PTFE (polytetra-fluoroethylene) or a PTFE compound. The flange area, the sealing lip and the intermediate area can be made from a single material and can form an all-in-one sealing body. Preferably, at least the sealing lip is made of a PTFE compound.

According to the invention, the annular spring has a U-shaped or V-shaped cross section, wherein an outer limb of the U-shaped or V-shaped cross section bears on the inner face of the flange area and an inner limb bears on the outer face of the sealing lip. The limbs of the U-shaped or V-shaped cross section of the spring are therefore supported on the inner face of the flange area and on the outer face of the sealing lip, wherein at least some of the pressing force for pressing the sealing lip onto the shaft is generated by an elastic deformation of the cross section. A remaining part of the pressing force can be generated if appropriate by the elasticity of the sealing lip itself or of the sealing body.

According to the invention, provision is also made that a surface of the annular spring exposed to an exterior of the shaft seal is coated with an elastomer. The exterior is in particular an outer space of the seal or of a housing into which the seal can be inserted, i.e. a space axially outside the seal or the housing. Here, "exposed" is to be understood as meaning a surface that is accessible from the direction in question and that is therefore exposed to a fluid present in the exterior. The coating with the elastomer is sufficiently thin, or the elastomer material is sufficiently flexible, to ensure that the mechanical properties of the spring are not appreciably altered. In particular, the coating is made sufficiently thin so as not to appreciably influence the elasticity, the resilience and the excursion of the spring. The elastomer material with which the spring is coated can be the same material as or a different material than the material of the sealing lip or of the flange area.

By virtue of the fact that the annular spring has a U-shaped or V-shaped cross section and bears on the flange area and on the sealing lip, it is easy to obtain a sufficient pressing force of the sealing lip onto the surface of a shaft guided through the shaft seal and to compensate for tolerances with respect to the diameter and position of the shaft and thereby achieve reliable sealing. By virtue of the fact that an exposed surface of the spring is coated with an elastomer material, it is possible to easily clean the spring and the shaft seal as a whole, even upon contact with contaminating media, for example tissue, blood or other body fluids.

According to a preferred embodiment of the invention, the exposed surface is the surface of the opening of the U-shaped or V-shaped cross section. Thus, according to this embodiment, the radially inner face of the outer limb of the U-shaped or V-shaped cross section and the radially outer face of the inner limb are coated with the elastomer, optionally also the base of a U-shaped cross section directed toward the opening. In particular, a center axis of the U or of the V of the U-shaped or V-shaped cross section is arranged in the axial direction of the shaft seal, wherein the opening of the U-shaped or V-shaped cross section is oriented toward an external space, which is an axial exterior of the seal, and is in fluid connection therewith and is coated with the elastomer in order to improve cleanability. This affords the further particular advantage that an elevated pressure acting in the exterior forces the limbs of the U-shaped or V-shaped cross section apart and thus increases the pressing force of the sealing lip and therefore the sealing action of the shaft seal. This therefore affords the possibility of installing the shaft seal in such a way that, on the one hand, the shaft seal is easy to clean following contact with contaminating media acting in the axial exterior, and, on the other hand, the sealing action is increased when an elevated pressure acts in the axial exterior. This is particularly advantageous in re-usable medical hand-pieces, in connection with which it is not just cleaning of the exposed surfaces that is necessary, but also sterilization, which generally takes place by autoclaving, i.e. applying hot steam at an elevated pressure. Since the sealing action of the shaft seal is improved at an elevated pressure, additional safety is achieved against admission of steam into the interior of the medical handpiece. Moreover, an underpressure may also act at times during autoclaving, which underpressure has the reverse effect that the sealing action of the shaft seal is reduced, thereby permitting the escape of any steam that may have gotten in.

Whereas the opening of the U-shaped or V-shaped cross section is exposed to the exterior, i.e. an axial exterior, of the seal, the side directed away from the opening can face toward an intermediate area of the shaft seal, which intermediate area connects the sealing lip to the flange area. A distance preferably remains between the base of the U or the tip of the V of the cross section and the intermediate area, so as not to impede a spring deflection for compensation of tolerances. Between the spring and the intermediate area, a closed internal space of the shaft seal can be formed into which no contaminants can enter.

Preferably, the end face of at least one limb, particularly preferably the ends faces of both limbs, of the U-shaped or V-shaped cross section is/are provided with the elastomer. In this way, the sealing between the spring and the flange area and/or sealing lip is improved and, in particular, contaminants are prevented from entering a closed space that is optionally formed behind the spring and that is not accessible for cleaning. Moreover, the fact that the spring is supported on the flange area and/or on the sealing lip by way of the elastomer permits a limited axial shift of the spring relative to the flange area and/or sealing lip and thus improves the sealing action of the shaft seal, even where considerable tolerances have to be compensated. Moreover, a digging of the end faces of the spring into the material of the flange area and/or sealing lip is reduced, as a result of which the service life of the shaft seal is improved.

It is particularly preferable that substantially the entire surface of the spring is coated with the elastomer, i.e. even an unexposed side of the spring and also the end faces of the limbs. The spring is thus surrounded by the elastomer on all sides. This simplifies production and further improves cleaning.

According to a preferred embodiment of the invention, the elastomer is vulcanized onto the surface of the spring. In this way, the adherence between the spring and the elastomer is improved. The spring can be made of steel, for example of preferably stainless spring steel, and the elastomer material can be vulcanized directly onto the steel spring, thereby permitting particularly firm adherence.

On its inner face, i.e. on the face directed toward the through-opening, the sealing lip advantageously has at least one sealing edge, wherein the spring sits on a portion of the outer face of the sealing lip lying radially opposite the at least one sealing edge. This allows the pressing force to be transferred particularly effectively in order to increase the sealing action.

The spring is preferably held behind at least one locking projection on the radial inner face of the flange area and/or on the radial outer face of the sealing lip. It is possible in this way to improve the stability and the sealing action of the shaft seal. Moreover, this facilitates the production of the shaft seal and, in particular, makes it easier to insert the spring exactly in position into a sealing body of the shaft seal so as to apply the pressing force to a sealing edge.

According to a preferred embodiment of the invention, the spring is alternately slit from one limb into the other limb, wherein the slits are covered by the elastomer coating. For example, the slits can extend from the end face of one limb to about the midway point of the opposite limb. The alternating arrangement of slits extending respectively into the opposite limb makes it easier to adapt the spring for installation into the shaft seal. By virtue of the fact that the slits are covered by the elastomer material of the coating and therefore the coating forms a continuous and in particular smooth surface, the cleanability of the seal is improved.

The shaft seal is preferably suitable for medical uses, in particular for sealing a rotary shaft of a surgical handpiece, and is made of materials that are suited to a medical use. In particular, the shaft seal is designed to seal a rotary shaft of a re-usable surgical handpiece and for this purpose has sufficient resistance to mechanical, chemical and thermal loads during the required cleaning and sterilization. The spring is preferably made of stainless steel.

A medical handpiece having a shaft seal according to the invention can, for example, be a handpiece of a surgical morcellator or shaver. Such a handpiece comprises a housing in which it is possible to arrange a drive and, if appropriate, further mechanisms, for example for flushing or suctioning irrigation liquid. The drive can comprise an electric motor or a connecting device to a flexible shaft for driving by an external motor. A motorized shaft, which carries a working tool of the morcellator or shaver, for example a cutting blade for comminution of soft tissue or for removal of cartilage or bone, is guided through an opening of the housing. The housing can carry a stationary tube which surrounds some areas of the rotary shaft. At its passage through the housing of the handpiece, the shaft is sealed off by a shaft seal according to the invention. A handpiece designed in this way is safely protected during operation against admission of contaminants and is also protected during autoclaving against admission of steam. Moreover, a handpiece of this kind is easy to clean. It is thus possible, in a reliable and simple way, to permit re-use and to improve the safety of the seal and the service life of the handpiece.

In a method according to the invention for producing a shaft seal, a shaft seal body with a radially outward flange area and a radially inward sealing lip connected to the flange area is made available. Moreover, an annular spring is made available which has a U-shaped or V-shaped cross section and which is designed to be inserted between the flange area and the sealing lip and to generate a pressing force of the sealing lip on a shaft that can be inserted into a through-opening surrounded by the sealing lip. A coating of an elastomer material is applied, in particular vulcanized, onto at least one face of the spring, preferably onto the entire surface of the spring. Finally, the elastomer-coated spring is inserted between the inner face of the flange area and the outer face of the sealing lip in such a way that the coated face of the spring is exposed to an exterior of the seal, i.e. to an axially arranged exterior. Locking projections are preferably provided on the inner face of the flange area and on the outer face of the sealing lip, behind which locking projections the spring is pushed in the axial direction and behind which the spring latches and is thereby held securely in the shaft seal. This permits simple production of a shaft seal which is easy to clean and which ensures a reliable sealing action. In particular, a shaft seal designed in the above-described manner can be produced by the method according to the invention.

It will be appreciated that the aforementioned features and the features still to be explained below can be used not only in the respectively cited combination, but also in other combinations or singly, without departing from the scope of the present invention.

BRIEF DESCRIPTION OF THE DRAWINGS

Further aspects of the invention will become clear from the following description of a preferred illustrative embodiment and from the attached drawing, in which.

DETAILED DESCRIPTION OF THE INVENTION

Figure 1:
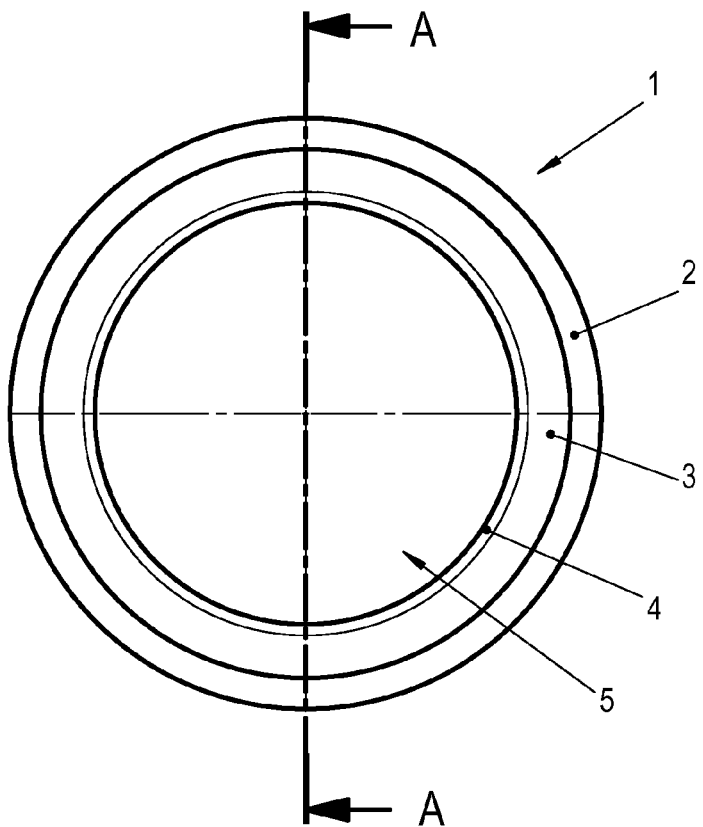
FIG. 1 shows a first illustrative embodiment of a shaft seal according to the invention, seen in a plan view from an axial direction.

As is shown in FIG. 1 in an axial view, a shaft seal 1 according to the invention has a substantially ring-shaped structure with an outer flange area 2, an intermediate area 3 adjoining the latter from the inside, and a sealing lip 4 arranged further to the inside. The shaft seal 1 surrounds a through-opening 5, through which it is possible to insert a shaft (not shown) on the surface of which the sealing lip 4 bears with a sealing action. The sealing lip 4, the intermediate area 3 and the flange area 2 are connected tightly to each other. The flange area 2 is designed to be inserted into a stationary structural part, for example into an opening or bore of a housing or into a bearing. This allows a rotary shaft to be sealed in the structural part.

Figure 2:
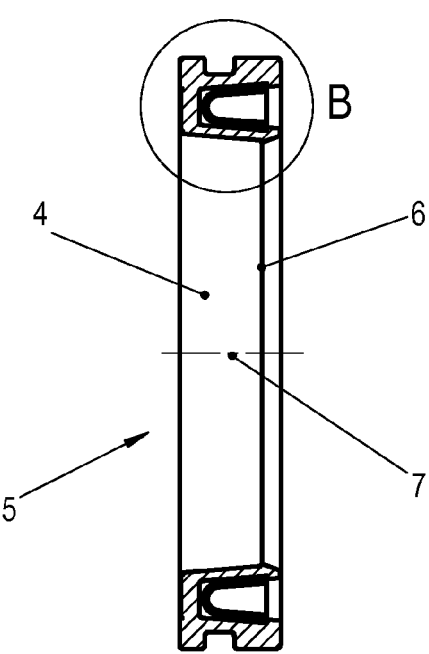
FIG. 2 shows a cross section through the shaft seal from FIG. 1 along a section line A-A.

FIG. 2 shows a cross section along the section line A-A of the illustrative embodiment shown in FIG. 1. The sealing lip 4, which surrounds the through-opening 5, has a sealing edge 6 directed toward the latter, which sealing edge 6 bears sealingly on the circumferential surface of an inserted shaft. An axis 7 of the shaft seal 1 substantially coincides with the longitudinal axis of a rotary shaft inserted into the shaft seal 1.

Figure 3:
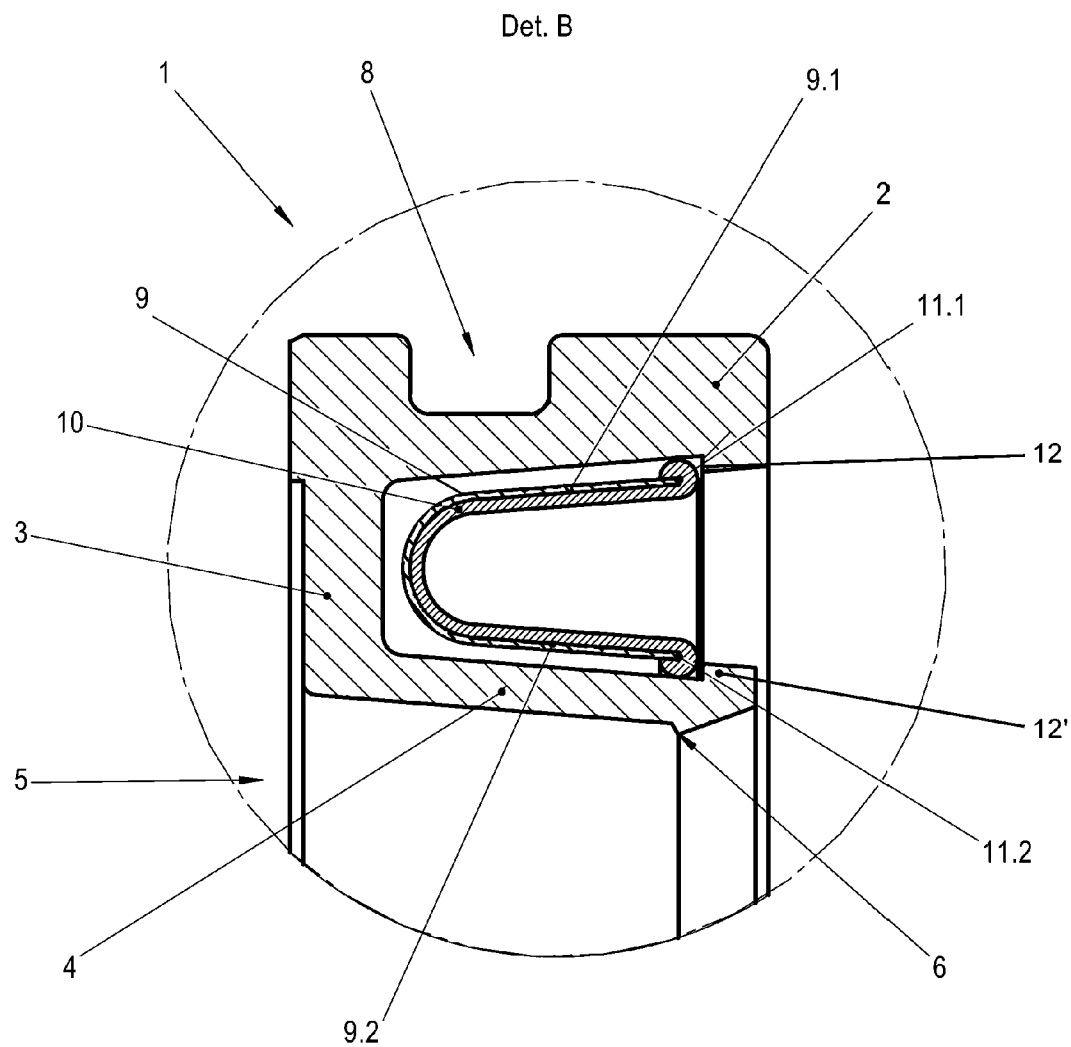
FIG. 3 shows an enlarged view of the detail indicated by B in FIG. 2.

FIG. 3 shows an enlarged view of the detail B from FIG. 2. As can be seen from FIG. 3, the shaft seal 1 shown by way of example here has a sealing body which is composed of the flange area 2, the intermediate area 3 and the sealing lip 4 and which is made entirely from a PTFE compound. The flange area 2 has a circumferential groove 8 which is designed to receive, for example, an O-ring for sealing against the structural part into which the shaft seal 1 is inserted. The sealing lip 4 has a sealing edge 6 which bears circumferentially on the surface of a shaft inserted into the through-opening 5. To generate a pressing force with which the sealing lip 6 bears on the shaft, a spring 9 is inserted between the sealing lip 4 and the flange area 2, which spring 9 has a substantially V-shaped cross section with a radially outer limb 9.1 and a radially inner limb 9.2. The spring 9 is made of steel and carries a coating 10 on the surface directed toward the opening of the V.

The end faces 11.1, 11.2 of the limbs 9.1, 9.2 of the spring 9 are likewise provided with the elastomer material. In this way, the ends of the limbs 9.1, 9.2 are surrounded on all sides by the elastomer and are therefore supported not directly, but instead via the elastomer, on the inner face of the flange area 2 and, respectively, on the outer face of the sealing lip 4. As a result, the elastomer material at the ends of the limbs 9.1, 9.2 is slightly deformed, and it also sinks slightly in the material of the flange area 2 and of the sealing lip 4 (indicated symbolically in FIG. 3 by the overlapping of the respective areas). The flange area 2 and the sealing lip 4 each have locking projections 12, 12' behind which the spring 9 is held securely. The outer limb 9.1 and the inner limb 9.2 engage on the flange area 2 and on the sealing lip 4, respectively, at an axial position that corresponds to the axial position of the sealing edge 6, in order to allow the pressing force generated by the spring 9 to be transferred effectively to the sealing edge 6. A distance remains between the tip of the V of the V-shaped cross section of the spring 9 and the intermediate area 3, such that an elastic deformation of the spring 9 as a result of a change of the angle enclosed by the limbs 9.1, 9.2 is not impeded during spring deflection.

The elastomer-coated surface of the spring 9 is exposed to the axial exterior arranged to the right of the shaft seal 1 in FIG. 3. Gases and liquids present in this external space cannot easily come into contact with the limbs 9.1, 9.2 of the spring, instead only with the coating 10. The latter is continuously smooth and is thus easy to clean. The surface of the limbs 9.1, 9.2 directed away from the opening of the V is not exposed to the exterior of the seal and, except for the area of the ends of the limbs 9.1, 9.2, is not coated with the elastomer material. No dirt can get into the closed interior of the shaft seal 1 formed by the spring 9 together with the intermediate area 3 and partial areas of the flange area 2 and of the sealing lip 4.

Figure 4:
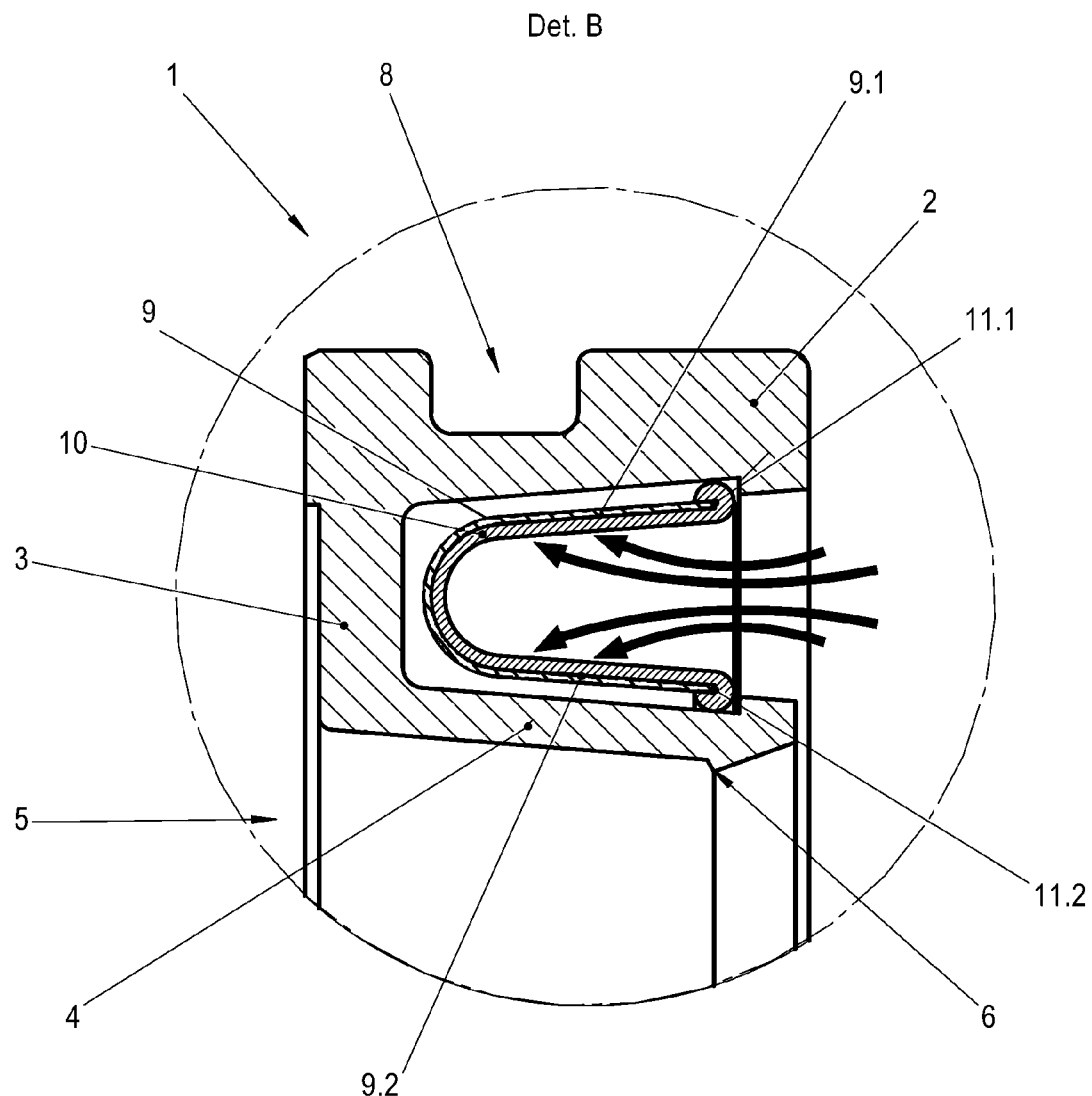
FIG. 4 shows the same view as FIG. 3, but with arrows showing the flow of a pressurized medium into the seal.

As is shown symbolically in FIG. 4, a further important advantage is afforded by virtue of the fact that the surfaces of the limbs 9.1, 9.2 directed toward the opening of the V of the V-shaped cross section of the spring 9 are provided with the coating 11. When an elevated pressure acts in the external space located to the right of the shaft seal 1, as is the case when an overpressure acts on a medical handpiece provided with the shaft seal 1, for example during autoclaving, the overpressure of the hot steam entering in the direction of the arrows generates an additional force on the limbs 9.1, 9.2, which forces the latter apart from each other, such that an increased pressing force is thereby made available for pressing the sealing edge 6 onto a shaft inserted via the through-opening 5. The sealing action of the shaft seal 1 is therefore strengthened under the effect of an elevated external pressure and, in this way, admission of hot steam into the interior of the handpiece during autoclaving is more reliably avoided.

Moreover, a decreased external pressure may at times act during autoclaving. In this case, the sealing action of the shaft seal 1 is reduced by the underpressure acting on the spring 9 (counter to the direction of the arrows shown in FIG. 4), or the sealing lip 4 or the sealing edge 6 can even lift slightly away from the surface of a shaft that is to be sealed. However, on account of the underpressure prevailing in the exterior at this point, no contaminant can get into the interior of the handpiece. Instead, any steam or moisture-charged air that may have gotten in is able to escape from the interior of the handpiece.

For the sake of clarity, not all reference signs are shown in all of the figures. Reference signs that are not explained in connection with one figure have the same meaning as in the other figures.

The invention claimed is:

1. A shaft seal, comprising:
   a radially outward flange area and a radially inward sealing lip connected to the flange area, the sealing lip having at least one sealing edge on a radial inner face of the sealing lip, and wherein the sealing lip is connected to the flange area via an intermediate area; and
   an annular spring arranged on a radial outer face of the sealing lip, the spring having a U-shaped or V-shaped cross section defined by a radial outer limb and a radial inner limb, the radial outer limb bearing on the flange area, and the radial inner limb bearing on a portion of the radial outer face of the sealing lip such that an end face of the radial inner limb is radially opposite the at least one sealing edge, and the spring is arranged so that the spring is completely separated by a closed space from the intermediate area;
   wherein a first surface of the spring defines an opening of the U-shaped or V-shaped cross section and is coated with an elastomer, a second surface of the spring is opposite the first surface of the spring and is directed away from the opening of the U-shaped or V-shaped cross section, an end face of the radial outer limb is radially opposite the end face of the radial inner limb, wherein the end faces of the radial inner and radial outer limbs are coated with the elastomer, and wherein at least the second surface of the spring proximate to the intermediate area is substantially not coated with elastomer, and
   wherein the spring is alternately slit from one of the outer limb or the inner limb, into the other of the outer limb or the inner limb, and the slits are coated by the elastomer, and wherein the spring does not directly contact the flange area or the sealing lip.

2. The shaft seal according to claim 1, wherein the elastomer is vulcanized onto the spring.

3. The shaft seal according to claim 1, wherein the spring is held by at least one locking projection arranged on at least one of i) the radial outer face of the sealing lip, and ii) a radial inner face of the flange area.

4. The shaft seal according to claim 1, wherein the shaft seal is designed to seal a rotary shaft of a re-usable surgical handpiece.

5. A method for producing a shaft seal, comprising the steps of:
   making available a shaft seal body with an outward flange area and an inward sealing lip connected to the flange area via an intermediate area, the sealing lip having at least one sealing edge on a radial inner face of the sealing lip;
   making available an annular spring which has a U-shaped or V-shaped cross section defined by a radial outer limb and a radial inner limb;
   coating a first surface of the annular spring directed toward an opening of the U-shaped or V-shaped cross section with an elastomer, coating an end face of the radial outer limb with an elastomer, and coating an end face of the radial inner limb that is radially opposite the end face of the radial outer limb with an elastomer;
   providing a second surface of the annular spring directed away from the opening of the U-shaped or V-shaped cross section with at least a substantial portion of the second surface proximate to the intermediate area not coated with the elastomer; and
   inserting the annular spring between the flange area and the sealing lip and thereby generating a pressing force from the spring acting on the sealing lip, the spring being inserted such that the second surface is separated by a closed space from the intermediate area, and the closed space extends from a first area adjacent to the radial outer limb to a second area adjacent to the radial inner limb, and the first area is in communication with the second area.

6. A shaft seal, comprising:
   a radially outward flange area and a radially inward sealing lip connected to the flange area, the sealing lip having at least one sealing edge on a radial inner face of the sealing lip; and
   an annular spring arranged on a radial outer face of the sealing lip, the spring having a U-shaped or V-shaped cross section defined by a radial outer limb and a radial inner limb, the radial outer limb bearing on the flange area, and the radial inner limb bearing on a portion of the radial outer face of the sealing lip such that an end face of the radial inner limb is radially opposite the at least one sealing edge;
   wherein a first surface of the spring defines an opening of the U-shaped or V-shaped cross section and is coated with an elastomer, a second surface of the annular spring is opposite the first surface of the annular spring and is directed away from the opening of the U-shaped or V-shaped cross section, an end face of the radial outer limb is radially opposite the end face of the radial inner limb, wherein the end faces of the radial inner and radial outer limbs are coated with the elastomer, wherein at least a substantial portion of the second surface of the spring proximate to an intermediate area is not coated with elastomer, and wherein the spring does not directly contact the flange area or the sealing lip, wherein the sealing lip is connected to the flange area via the intermediate area, and the spring is arranged so that the second surface is separated by a closed space from the intermediate area, and wherein the closed space extends from a first area adjacent to the radial outer limb to a second area adjacent to the radial inner limb, and the first area is in communication with the second area.

7. The shaft seal according to claim 6, wherein the elastomer is vulcanized onto the spring.

8. The shaft seal according to claim 6, wherein the spring is held by at least one locking projection arranged on at least one of i) the radial outer face of the sealing lip, and ii) a radial inner face of the flange area.

9. The shaft seal according to claim 6, wherein the shaft seal is designed to seal a rotary shaft of a re-usable surgical handpiece.

* * * * *